(12) United States Patent
Kranzley

(10) Patent No.: US 8,768,837 B2
(45) Date of Patent: Jul. 1, 2014

(54) METHOD AND SYSTEM FOR CONTROLLING RISK IN A PAYMENT TRANSACTION

(75) Inventor: Arthur D. Kranzley, Pound Ridge, NY (US)

(73) Assignee: MasterCard International Incorporated, Purchase, NY (US)

(*) Notice: Subject to any disclaimer, the term of this patent is extended or adjusted under 35 U.S.C. 154(b) by 122 days.

(21) Appl. No.: 12/598,730

(22) PCT Filed: May 1, 2008

(86) PCT No.: PCT/US2008/062208
§ 371 (c)(1),
(2), (4) Date: Jun. 8, 2010

(87) PCT Pub. No.: WO2008/137540
PCT Pub. Date: Nov. 13, 2008

(65) Prior Publication Data
US 2010/0262542 A1    Oct. 14, 2010

Related U.S. Application Data

(60) Provisional application No. 60/915,861, filed on May 3, 2007.

(51) Int. Cl.
*G06Q 40/00*    (2012.01)

(52) U.S. Cl.
USPC .............................................. 705/44; 705/35

(58) Field of Classification Search
USPC ........................................ 705/50, 40, 35, 44
See application file for complete search history.

(56) References Cited

U.S. PATENT DOCUMENTS

| 2003/0140007 A1 | 7/2003 | Kramer et al. | |
| 2006/0112275 A1* | 5/2006 | Jeal et al. | 713/183 |
| 2011/0087528 A1* | 4/2011 | Matsuda et al. | 705/14.4 |

* cited by examiner

*Primary Examiner* — Ojo Oyebisi
(74) *Attorney, Agent, or Firm* — Baker Botts LLP

(57) ABSTRACT

Example embodiments of the presently described subject matter are described that require a customer to use a secure payment token if, during a payment transaction, it is determined that the payment transaction poses a risk. A risk analysis may be performed based at least in part on data related to the payment transaction, such as data related to the customer, the transaction itself, the merchant, etc. If the results of the risk analysis indicate that an unacceptable amount of risk exists, the merchant or any interested party may require the customer to use a secure payment token, for example, a smart card, to conduct the transaction. Otherwise, the customer may proceed by using a static payment token, for example a credit card or PIN/password-based payment token.

23 Claims, 2 Drawing Sheets

METHOD AND SYSTEM FOR CONTROLLING RISK IN A PAYMENT TRANSACTION

RELATED APPLICATION

This application is a National Phase of International Application PCT/US08/062208, entitled Method And System For Controlling Risk In A Payment Transaction, filed May 1, 2008, which claims priority to U.S. provisional patent application 60/915,861, entitled Method and System for Controlling Risk in an E-Commerce Transaction, filed May 3, 2007, which are hereby incorporated by reference in their entirety herein.

BACKGROUND

Performing transactions remotely, such as over the Internet or other computer networks, using a payment token (e.g., a payment card) has traditionally presented a higher risk of fraud because the merchant is not able to verify the identity of the person presenting the payment token data, and no physical signature may be received from the token holder at the time of the transaction.

Various techniques have been developed to minimize the possibility of fraudsters submitting stolen payment token information when conducting transactions remotely. One such technique offered by MasterCard Worldwide is known as SECURECODE™, which permits cardholder verification and/or authentication at the time of an online transaction. In one implementation of the technique, before attempting a transaction, the cardholder is requested to enroll in the program by visiting a registration website where, after confirming that the account is eligible for enrollment in the program, the identity of the cardholder is verified by prompting the cardholder to answer one or more security questions, or other techniques. Once the identity of the cardholder is verified, the cardholder is prompted to set up and define his or her SECURECODE, which is a PIN or password known only to the cardholder. This SECURECODE is then stored in a secure database available to the financial institution that issued the payment card, and used for subsequent cardholder verification.

When the cardholder subsequently attempts to use the payment card at an online merchant, the cardholder's card number is entered into a web form, or otherwise made available to the merchant, and the merchant's computer queries a directory to verify if the card is within a range of card numbers that participate in the SECURECODE program. Rather than consulting a directory server, the merchant may instead query a local cache of participating card number ranges. If the card number used is within a participating range, the merchant then sends a message to a computer maintained by the issuer or its representative, to determine if the account being used is enrolled in the SECURECODE program. If the card account being used is enrolled, the merchant sends an instruction to the cardholder's computer, which then initiates communication with the issuer's computer. The cardholder is prompted to enter his or her PIN or password in a box on the cardholder's computer screen. The PIN or password is then verified by the issuer. If the issuer determines that the correct PIN or password has been entered, the issuer generates an Accountholder Authentication Value (AAV), which is returned to the merchant's web server application. Thereafter, the traditional payment processing occurs, except that the AAV is inserted in the authorization request message generated by the financial institution with whom the merchant maintains a relationship. The AAV is then used by the issuer to verify that the identify of the cardholder performing the online transaction has been verified using the SECURECODE process before returning an authorization response message to the merchant, or the merchant's acquirer.

In another embodiment of the SECURECODE process, rather than using a static PIN or password, the cardholder is provided with an intelligent token, such as an IC card or a contactless device, as well as an intelligent card reader, to interact with the intelligent token. In this approach, the cardholder is prompted to use the token to generate a dynamic security code, which is entered into a web form by the cardholder, or the intelligent token reader, and the dynamic security code is submitted to the issuer transaction to authenticate the cardholder. Such a system is described in more detail in U.S. patent application Ser. No. 10/506,016, entitled "Authentication Arrangement And Method For Use With Financial Transactions," filed on Feb. 28, 2003, which is incorporated by reference herein in its entirety.

While the use of a static PIN and/or password can be effective at deterring or preventing fraudulent online transactions using stolen payment token information, this approach is not effective unless the token holder registers the payment token with the issuer in the program, and associates a PIN or password with the account. In some circumstances, it may be possible to force the token holder to register the token in the program the first time the token holder attempts an online purchase using a payment token that is eligible for use with the secure transaction program. Alternatively, the cardholder may be allowed to decline to register a predetermined number of times, before being forced to register in the program before further E-commerce or online transactions are permitted.

In some online or E-commerce transactions, however, the risk of fraud is not great enough to justify requiring a token holder to register his or her account and create a SECURECODE PIN or password. Additionally, even when a token holder is registered with a secure transaction program, the nature of the transaction may not justify the additional time and burden of requiring the PIN or password be verified before permitting the transaction.

SUMMARY

Methods and systems for controlling risk in a payment transaction are described herein.

One example embodiment may include a procedure for controlling risk in a payment transaction between a customer and a merchant using a secure payment token comprising receiving transaction data related to said payment transaction; performing a risk analysis, said risk analysis based at least in part on said transaction data; and requiring said payment transaction to be conducted using said secure payment token based at least in part on the result of said risk analysis.

One example embodiment may include the procedure wherein said payment transaction is an E-commerce transaction. One example embodiment may include the procedure wherein said requiring said payment transaction to be conducted using said secure payment token includes requiring said merchant to conduct said payment transaction using said secure payment token. One example embodiment may include the procedure wherein said requiring said payment transaction to be conducted using said secure payment token includes requiring said customer to conduct said payment transaction using said secure payment token. One example embodiment may include the procedure wherein said risk analysis is based at least in part on data related to said customer. One example embodiment may include the procedure wherein said risk analysis is based at least in part on data related to said merchant. One example embodiment may include the procedure wherein said risk analysis is based at least in part on data related to said payment transaction. One example embodiment may include the procedure further comprising receiving attempt transaction data, said attempt transaction data generated from a prior attempt to conduct said payment transaction with a static data payment token, wherein said risk analysis is based at least in part on said attempt transaction data.

One example embodiment may include a procedure for controlling risk in a payment transaction between a customer and a merchant using a secure payment token comprising receiving the results of performing a risk analysis, said risk analysis based at least in part on said transaction data, said transaction data related to said payment transaction; and requiring said payment transaction to be conducted using said secure payment token based at least in part on the result of said risk analysis.

One example embodiment may include a computer readable medium including executable instructions thereon for controlling risk in a payment transaction between a customer and a merchant using a secure payment token, the instructions comprising the steps of receiving transaction data related to said payment transaction; performing a risk analysis based at least in part on said transaction data; and requiring said payment transaction to be conducted using said secure payment token based at least in part on the result of said risk analysis.

One example embodiment may include the computer readable medium wherein said payment transaction is an E-commerce transaction. One example embodiment may include the computer readable medium wherein said requiring said payment transaction to be conducted using said secure payment token includes requiring said merchant to conduct said payment transaction using said secure payment token. One example embodiment may include the computer readable medium wherein said requiring said payment transaction to be conducted using said secure payment token includes requiring said customer to conduct said payment transaction using said secure payment token. One example embodiment may include the computer readable medium wherein said risk analysis is based at least in part on data related to said customer. One example embodiment may include the computer readable medium wherein said risk analysis is based at least in part on data related to said merchant. One example embodiment may include the computer readable medium wherein the risk analysis is based at least in part on data related to said payment transaction. One example embodiment may include the computer readable medium wherein said controlling risk further comprises the steps of receiving attempt transaction data, said attempt transaction data generated from a prior attempt to conduct said payment transaction with a static data payment token, wherein said risk analysis is based at least in part on said attempt transaction data.

BRIEF DESCRIPTION OF THE DRAWINGS

For a more complete understanding of example embodiments of the presently described subject matter and its advantages, reference is now made to the following description, taken in conjunction with the accompanying drawings, in which.

DETAILED DESCRIPTION

Generally, example embodiments of the presently described subject matter are described that require a customer to use a secure payment token if, during a payment transaction, it is determined that the payment transaction poses a risk. A risk analysis may be performed based at least in part on data related to the payment transaction, such as data related to the customer, the transaction itself, the merchant, etc. If the results of the risk analysis indicate that an unacceptable amount of risk exists, the merchant or any interested party may require the customer to use a secure payment token, for example, a smart card, to conduct the transaction. Otherwise, the customer may proceed by using a static payment token, for example a credit card or PIN/password-based payment token.

In this way, a customer, merchant, customer account provider, payment token issuer, or any interested third party may minimize risk in electronic payment transactions by requiring transactions that pose a risk to be performed in a more secure manner.

Figure 1:
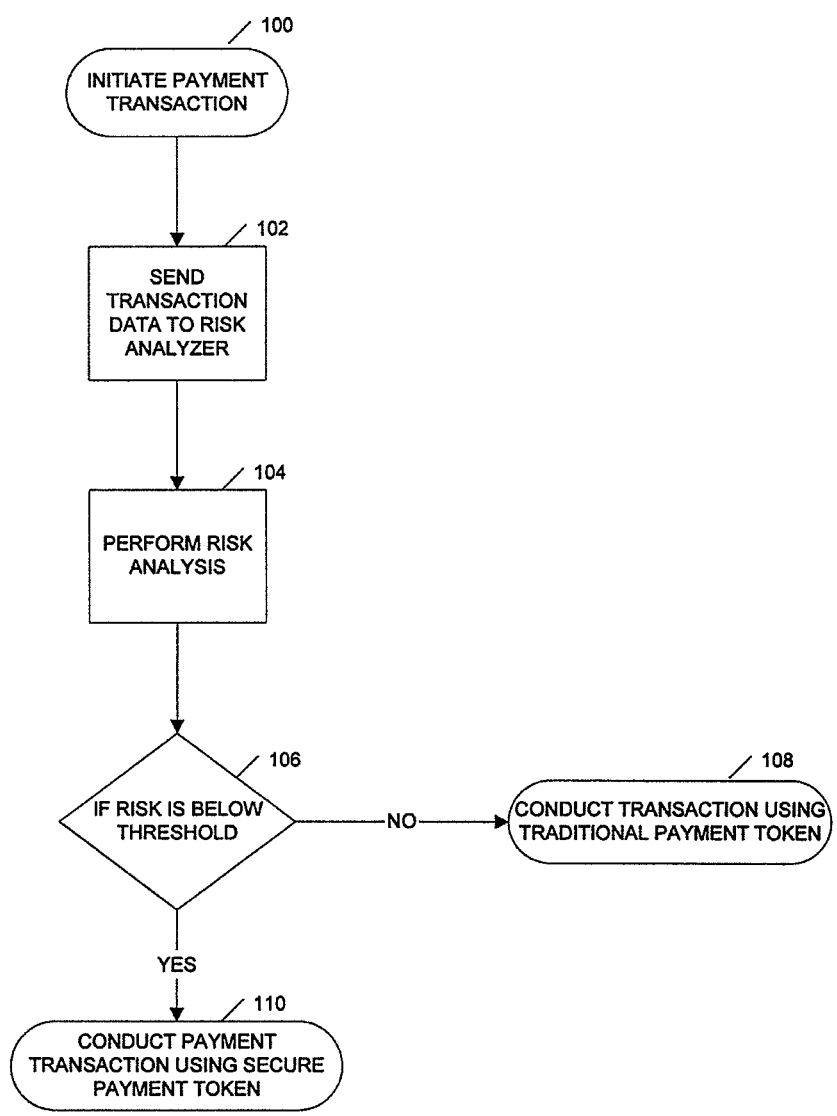
FIG. 1 is a flowchart of a procedure according to one example embodiment of the presently described subject matter.

FIG. 1 depicts an example procedure according to an example embodiment of the presently described subject matter. A customer may initiate a payment transaction (block 100). It is contemplated that the customer may be present at a merchant site, for example, a customer presenting goods for purchase at a traditional merchant store. It is also contemplated that the customer may be at a location remote from the merchant, for example, conducting a transaction over a data communications network such as the internet or the telephone. Once the customer initiates the payment transaction (e.g., a request to purchase goods or services from the merchant), the merchant may form a payment transaction message. The payment transaction message may include any data necessary to complete the transaction, for example, any of, combinations of, or all of, the customer's name, address, billing information, the merchant's name, identifying information for the merchant, customer account, merchant account, payment token issuer information, etc. For example, a customer wishing to purchase goods from a merchant's website may fill out a web form with data related to the transaction. A purchase request, in the form of an HTTP message may be sent over a data communications infrastructure to the merchant's site.

Once the merchant has received the payment transaction message, the merchant may send transaction data (e.g., the request itself, data derived therefrom, or any appropriate data related to the purchase request) to a risk analyzer (block 102). The transaction data may include any data required to perform a risk analysis of the payment transaction. In one example embodiment, the transaction data may be related to the customer, merchant, payment token, or any appropriate aspect of the purchase request. For example, data related to the customer may include the customer's name, history of past transactions, history of fraud, length of time that the customer has been affiliated with a traditional payment token issuer, or the like. In another example embodiment, data related to the merchant may include the merchant's name, geographic location of the merchant, history of the merchant's declined transactions, the length of time that the merchant has been in business, the merchant's credit rating, etc. In another example, data related to the transaction itself may include the time, date, amount of the transaction, type of goods or services to be purchased, originating country, etc. In another example, data may be tangentially related to the payment transaction, such as the level of security in the data transfer protocols used between the customer and the merchant or between the merchant and a payment account provider, whether the payment transaction is subject to an intermittent spot check, etc.

A risk analysis may be performed based at least in part on the transaction data or other relevant data (block 104). The risk analysis may include making an observation and determining whether the observation satisfies a particular condition. For example, a condition may include whether the customer account appears on a list of accounts to which fraudulent activity has been linked. In another example, a condition may include whether the amount of the transaction is above a threshold amount. In another example, a condition may include whether the type of goods or services is a type for which a high number of fraudulent transactions has previously been reported. In practice, the risk analysis may be performed based on any data relevant to the particular requirements of the system.

If a risk level, as determined by the results of the risk analysis, is unacceptable (block 106) (e.g., above a particular risk threshold), then the merchant or customer may be required to conduct the payment transaction using a secure payment token rather than a static payment token (block 110). Otherwise, the merchant or customer may complete the transaction using a static payment token (block 108). For example, the risk analyzer may receive the merchant's name and search a list of merchants through which known fraudsters have conducted transactions in the past. If the merchant's name appears on the list, the risk level for the transaction may dictate that the merchant must conduct the transaction using a secure payment token.

Figure 2:
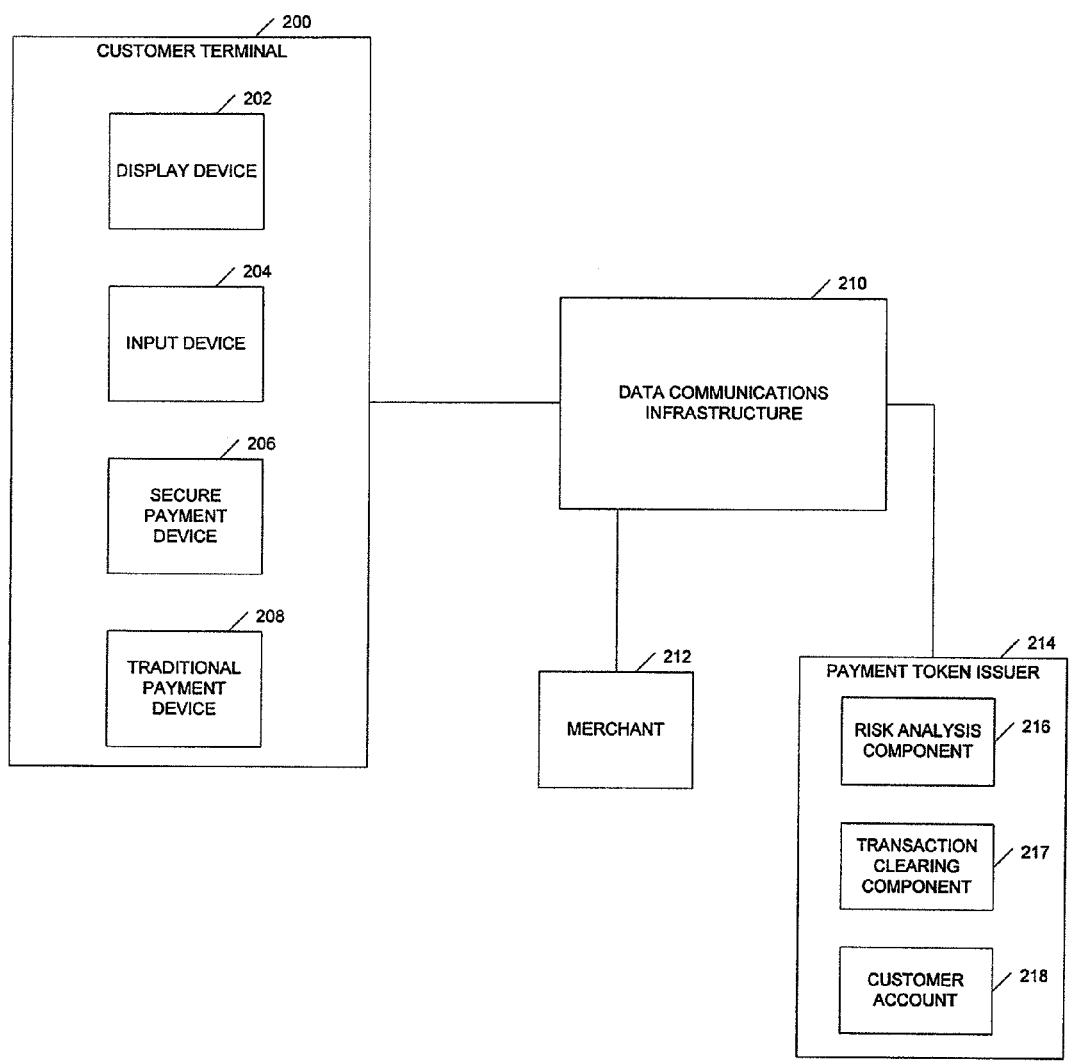
FIG. 2 is a block diagram of components according to one example of the presently described subject matter.

FIG. 2 depicts example components according to an example embodiment of the presently described subject matter. A customer terminal 200 may be in communication with a merchant 212 over a data communications infrastructure 210. The merchant 212 may be in communication with a payment token issuer 214 over the data communications infrastructure 210. A customer wishing to purchase a product or service from the merchant 212 may select a product or service from the merchant 212. For example, the merchant 212 may maintain an internet site. The customer may use customer terminal 200 to access the merchant's internet site over data communications infrastructure 210. The customer terminal 200 may include facilities for the customer to browse the merchant's internet site, such as display device 202 to view the products and for navigation on the site. The customer terminal 200 may also include input device 204 to make selections of products and services to be purchased as well as to navigate the merchant's site. It is contemplated that the display device may communicate with the customer in any appropriate medium, including visual, aural, tactile, combinations of the foregoing, etc. It is contemplated that the input device may also accept input in various media, including physical input (e.g., a keyboard, mouse, pen input, etc.), aural input, combinations of the foregoing, etc. The display device 202 and input device 204 may include one or more devices for performing the operations required.

The customer terminal 200 may also include payment facilities for conducting payment transactions with the merchant 212. Payment facilities may include a static payment device 208 and/or a secure payment device 206. If the customer is required to conduct the payment transaction using the secure payment device 206, then the secure payment device 206 may be used. Otherwise, the customer may conduct the transaction using the static payment device 208.

The static payment device 208 may be capable of interacting with static payment tokens. Static payment tokens may include payment tokens which include static data, for example, data encoded on a magnetic stripe of a credit card, a static PIN/password entered with a transaction, etc. In one example, a static payment token such as a credit card may be read by a static payment device such as a card reader. A static payment device may also include a keypad by which a customer may enter a PIN. The PIN may be static owing to the fact that it remains the same unless changed by the customer. For example, a payment token which requires the customer to enter a PIN/password to authenticate the transaction may be considered static. This payment token may be relatively easy to copy by fraudsters because the latter need only obtain the payment token and the static PIN/password to pose as the customer.

The secure payment device 206 may be capable of interacting with secure payment tokens. Secure payment tokens may include, for example, payment tokens capable of generating dynamic data to be used during a payment transaction. For example, payment tokens that generate dynamic data may include smart cards with embedded processors, a secure key fob with changing data from which the user reads and enters the data for the payment transaction, etc. Generating dynamic data to be used in a payment transaction may improve the security of the transaction by making it more difficult for a fraudster to copy and use payment tokens. For example, a secure payment token may include a payment token capable of performing operations to encrypt transaction messages. The encryption may be based on information known to the account provider and the secure payment token/customer, for example, a shared secret key or public/private key information. Unless the fraudster is able to obtain the secret information, obtain the payment token, and perform the necessary operations to encrypt the data, the fraudster will be unable to generate the dynamic data necessary to conduct the transaction. Other forms of securing transactions using dynamic data are well known to those ordinarily skilled in the art.

Once the selection of a product or service has been accomplished, the customer terminal 200 may send a payment transaction message to the merchant site over the data communications infrastructure 210. It is contemplated that the data communications infrastructure may include data networks and processor busses and may include local or wide area communications. The specific implementation of the data communications infrastructure, unless specified, is immaterial to the principles of the presently described subject matter.

A risk analysis may be performed, and the merchant 212 may receive the results of the risk analysis. The risk analysis may be based at least in part on data related to the payment transaction. For example, the merchant 212 may generate transaction data from the payment transaction and send the transaction data to the payment token issuer 214 over the data communications infrastructure 210.

A risk analysis component or risk analyzer 216 may perform the risk analysis and send the results of the risk analysis back to the merchant 212. The merchant 212 may determine based at least in part on the results of the risk analysis that the payment transaction poses a risk. In one example embodiment, the risk analysis component itself may determine that a risk exists.

The risk analyzer may be operated by any entity, for example, the merchant, the payment token issuer, an organization specialized in performing risk analyses, etc.

In one example embodiment, the merchant or customer may be required to conduct the payment transaction using the secure payment token owing to the fact that a risk has been identified. Requiring the merchant or customer to conduct a payment transaction using the secure payment token may include any operations which prevent the merchant or customer from proceeding forward with the transaction without the secure payment token. For example, the payment token issuer may receive the results of a risk analysis and where the risk level is higher than a certain threshold, the payment token issuer may refuse to proceed with the payment transaction if the secure payment token is not used. In another example embodiment, the merchant may receive a message from the payment token issuer, or any other entity, that indicates the type of payment token to use. For example, the message may include a flag set to indicate that the transaction requires the merchant to process the transaction using the secure payment token.

In one example embodiment, the secure payment token may include the integrated circuit card described in U.S. patent application Ser. No. 10/506,016, which is incorporated by reference herein.

A requirement for the merchant or customer to conduct the payment transaction using the secure payment token may be imposed by any appropriate entity. For example, a third party risk analyzer, distinct from the payment token issuer or merchant, may analyze the risk and provide the merchant or the payment token issuer with a message reflecting its decision of whether a secure payment token should be used. The merchant may itself impose this requirement by refusing to proceed with completing the transaction with the customer. The payment token issuer may itself impose this requirement by refusing to remit funds to the merchant's account if the secure payment token is not used.

If no risk is identified, the customer may be permitted to complete the transaction using the static payment device.

In one example embodiment, the results received which are related to a performed risk analysis may include the evaluation of the risk analysis itself or data derived therefrom. For example, the results may include a code indicating which payment token to use in the transaction. This code may depend, at least in part, on the evaluation of the risk analysis. In another example, the results may include a score of risk. In yet another example, the results may include a value indicating whether the risk is or is not acceptable.

The foregoing merely illustrates the principles of the presently described subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the described subject matter and are thus within the spirit and scope of the described subject matter.

The invention claimed is:

1. A method for controlling risk in a payment transaction between a customer and a merchant using a secure payment token comprising: receiving transaction data related to said payment transaction; performing, by a risk analyzer, a risk analysis, said risk analysis based at least in part on said transaction data, the risk analyzer comprising a non-transitory computer-readable medium including executable instruction thereon; and requiring said payment transaction to be conducted using said secure payment token based at least in part on the result of said risk analysis; receiving attempt transaction data, said attempt transaction data generated from a prior attempt to conduct said payment transaction with a static data payment token, wherein said risk analysis is based at least in part on said attempt transaction data.

2. The method of claim 1, wherein said payment transaction is an E-commerce transaction.

3. The method of claim 1, wherein said requiring said payment transaction to be conducted using said secure payment token includes requiring said merchant to conduct said payment transaction using said secure payment token.

4. The method of claim 1, wherein said requiring said payment transaction to be conducted using said secure payment token includes requiring said customer to conduct said payment transaction using said secure payment token.

5. The method of claim 1, wherein said risk analysis is based at least in part on data related to said customer.

6. The method of claim 1, wherein said risk analysis is based at least in part on data related to said merchant.

7. The method of claim 1, wherein said risk analysis is based at least in part on data related to said payment transaction.

8. The method of claim 1, further comprising:
receiving attempt transaction data, said attempt transaction data generated from a prior attempt to conduct said payment transaction with a static data payment token, wherein said risk analysis is based at least in part on said attempt transaction data.

9. A method for controlling risk in a payment transaction between a customer and a merchant using a secure payment token comprising: receiving, via a data communications infrastructure, the results of performing a risk analysis, said risk analysis based at least in part on said transaction data, said transaction data related to said payment transaction; and requiring said payment transaction to be conducted using said secure payment token based at least in part on the result of said risk analysis; receiving attempt transaction data, said attempt transaction data generated from a prior attempt to conduct said payment transaction with a static data payment token, wherein said risk analysis is based at least in part on said attempt transaction data.

10. A non-transitory computer readable medium including executable instructions thereon for controlling risk in a payment transaction between a customer and a merchant using a secure payment token, the instructions comprising the steps of: receiving transaction data related to said payment transaction; performing a risk analysis based at least in part on said transaction data; and requiring said payment transaction to be conducted using said secure payment token based at least in part on the result of said risk analysis; receiving attempt transaction data, said attempt transaction data generated from a prior attempt to conduct said payment transaction with a static data payment token, wherein said risk analysis is based at least in part on said attempt transaction data.

11. The non-transitory computer readable medium of claim 10, wherein said payment transaction is an E-commerce transaction.

12. The non-transitory computer readable medium of claim 10, wherein said requiring said payment transaction to be conducted using said secure payment token includes requiring said merchant to conduct said payment transaction using said secure payment token.

13. The non-transitory computer readable medium of claim 10, wherein said requiring said payment transaction to be conducted using said secure payment token includes requiring said customer to conduct said payment transaction using said secure payment token.

14. The non-transitory computer readable medium of claim 10, wherein said risk analysis is based at least in part on data related to said customer.

15. The non-transitory computer readable medium of claim 10, wherein said risk analysis is based at least in part on data related to said merchant.

16. The non-transitory computer readable medium of claim 10, wherein the risk analysis is based at least in part on data related to said payment transaction.

17. The method of claim 1, wherein requiring said payment transaction to be conducted using said secure payment token based at least in part on the result of said risk analysis comprises transmitting a message to said merchant, said message comprising a flag set indicating that said merchant is required to process said transaction using said secure payment token.

18. The method of claim 1, wherein said secure payment token comprises a payment token capable of generating dynamic data.

19. The method of claim 1, wherein said secure payment token comprises a payment token capable of performing operations to encrypt transaction messages.

20. The method of claim 1, wherein said secure payment token comprises a smart card with an embedded processor.

21. The method of claim 1, wherein performing a risk analysis comprises determining a risk level, and requiring said payment transaction to be conducted using said secure payment token based at least in part on the result of said risk analysis comprises requiring said payment transaction to be conducted using said secure payment token where said risk level is higher than a risk level threshold.

22. A method for controlling risk in a payment transaction between a customer and one or more merchants using a secure payment token comprising: receiving first transaction data related to a first payment transaction; performing, by a risk analyzer, a first risk analysis, said first risk analysis based at least in part on said first transaction data, the risk analyzer comprising a non-transitory computer readable medium including executable instruction thereon; requiring said payment transaction to be conducted using said secure payment token based at least in part on the result of said risk analysis; receiving second transaction data related to a second payment transaction; performing a second risk analysis, said second risk analysis based at least in part on said second transaction data; and permitting said customer to proceed with said second payment transaction using a static payment token; receiving attempt transaction data, said attempt transaction data generated from a prior attempt to conduct said payment transaction with a static data payment token, wherein said risk analysis is based at least in part on said attempt transaction data.

23. The method of claim 22, wherein said second payment transaction occurs prior to said first payment transaction.

* * * * *